Feb. 3, 1948.  S. E. BRILLHART  2,435,266
APPARATUS FOR TESTING CABLES
Filed Oct. 3, 1944  2 Sheets-Sheet 1
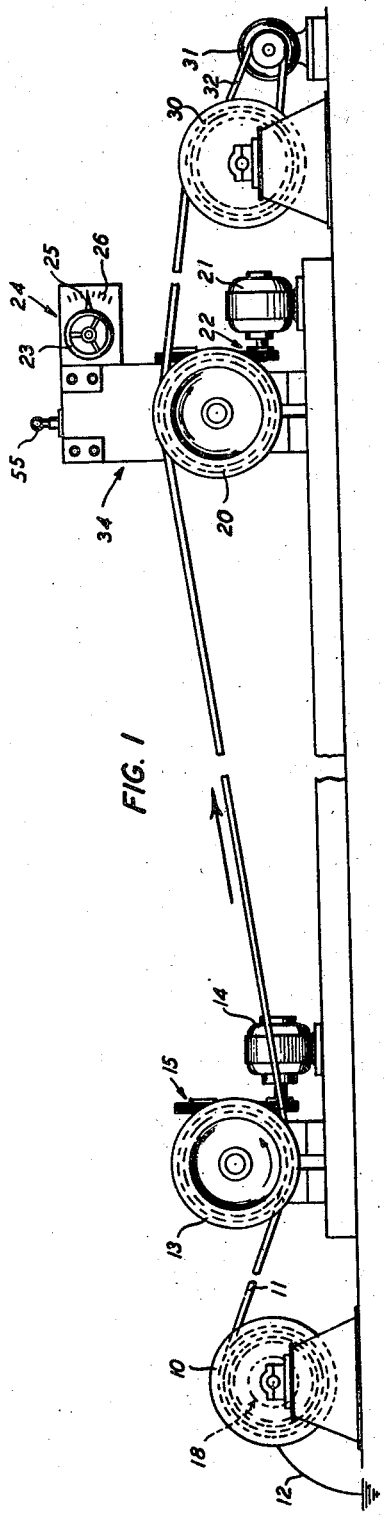
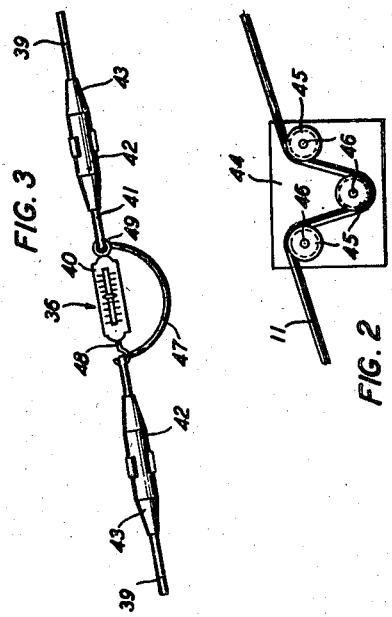
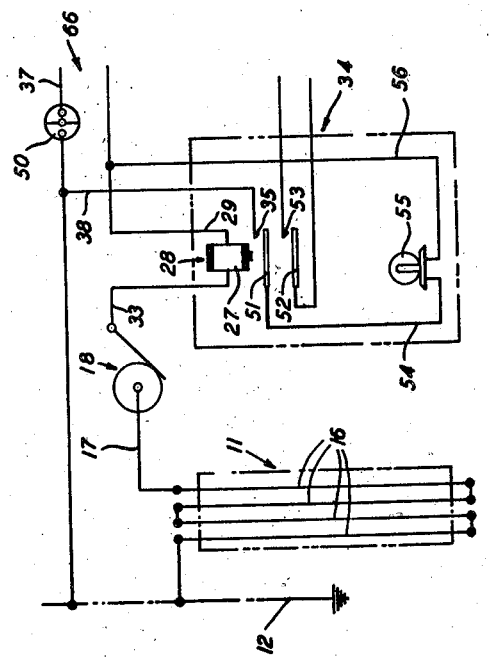
INVENTOR
S. E. BRILLHART
BY
ATTORNEY

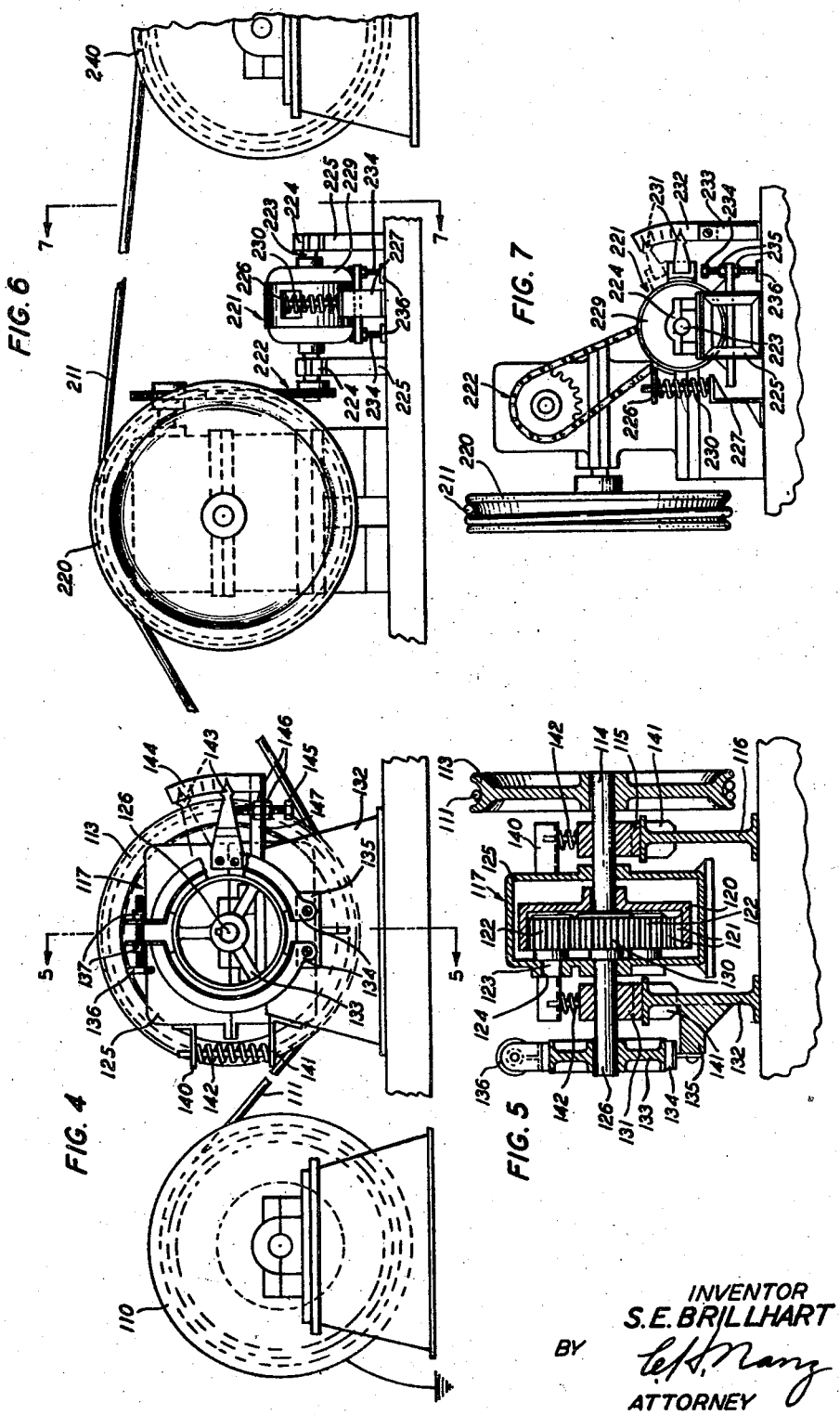

Patented Feb. 3, 1948

2,435,266

UNITED STATES PATENT OFFICE 2,435,266

APPARATUS FOR TESTING CABLES

Samuel E. Brillhart, Lutherville, Md., assignor to Western Electric Company, Incorporated, New York, N. Y., a corporation of New York Application October 3, 1944, Serial No. 556,966

2 Claims. (Cl. 28—71.3)

This invention relates to apparatus for testing cables, and has for its object the provision of new and improved apparatus for testing cables.

An apparatus constituting one embodiment of the invention includes means for advancing a cable, means for tensioning a cable advanced by the advancing means, means for measuring the tension applied to the cable, and means for determining electrical characteristics of the cable being tested.

A complete understanding of the invention may be obtained from the following detailed description of a specific embodiment thereof, when read in conjunction with the appended drawings, in which:

Fig. 1 is a front elevational view of an apparatus forming one embodiment of the invention;

Fig. 2 is an enlarged front elevational view of a device which may be used with the apparatus shown in Fig. 1;

Fig. 3 is a front elevational view of a device which may be used with the apparatus embodying the invention;

Fig. 4 is an enlarged front elevational view of a portion of an apparatus constituting an alternative embodiment of the invention;

Fig. 5 is an enlarged vertical sectional view taken along line 5—5 of Fig. 4;

Fig. 6 is an enlarged front elevational view of a portion of an apparatus constituting another embodiment of the invention;

Fig. 7 is an enlarged vertical sectional view taken along line 7—7 of Fig. 6, and Fig. 8 is a diagrammatic view of an electrical testing circuit of the apparatus.

Referring more in detail to the drawings there is shown therein apparatus for testing the continuity of conductors of cables of a type having a plurality of individually insulated conductors enclosed in a braided metallic sheath, which has great mechanical strength. To test the continuity of the conductors of such a cable large tensile forces must be applied to the cable to open some types of discontinuities in the conductors. One apparatus for testing the continuity of conductors of cables while applying high tensile forces to the cables is illustrated in Fig. 1. This apparatus includes a supply reel 10 containing a supply of a cable 11, which is to be tested. The cable 11 includes four individually insulated conductors 16—16 (Fig. 8), which are connected in series, grounded at one end thereof by a conductor 12, and connected at the other end thereof by a conductor 17 to a slip ring assembly 18 associated with the supply reel 10 (Fig. 1). A take-off capstan 13 driven by a constant speed electric motor 14 through a drive 15 serves to advance the cable 11 from the supply reel 10.

A tensioning capstan 20 (Fig. 1) is driven by a torque motor 21 through a drive 22. A hand wheel 23 of a controller 24 of a well known type may be turned to adjust the torque of the motor 21 as desired. The torque of the motor 21 is adjusted so that the tensioning capstan 20 places the portion of the cable 11 between the tensioning capstan and the take-off capstan 13 under a predetermined high tension.

The force thus applied to the cable 11 may be varied from a negligible value to 250 pounds, or more. The capstans 13 and 20 are spaced apart about 100 feet so that the cable is suspended therebetween under conditions simulating those under which the cable is to be used. A pointer 25 (Fig. 1) secured to the handwheel 23 is movable relative to a scale 26 and serves to indicate on the scale the tension which is placed upon the cable 11 for any setting of the controller 24. A take-up reel 30 (Fig. 1) driven by a motor 31 through a belt 32 serves to advance the cable 11 from the capstan 20 and wind it thereon.

A test set 34 (Figs. 1 and 8) of a conventional type is connected by a conductor 33 to the slip ring assembly 18. The conductor 33 is connected to one end of a winding 27 of a relay 28, and the other end of the winding is connected to a conductor 29 of a power line 66. A second conductor 37 of the power line is grounded, is connected by a conductor 38 to a contact 35 of the relay 28, and has a manually operated switch 50 therein. A contactor 51 is held in engagement with the contact 35 when the winding 27 is energized, at which time a contactor 52 is held in engagement with a contact 53. The contactor 51 is connected by a conductor 54 to an incandescent lamp 55, which is connected by a conductor 56 to the conductor 29. The lamp 55 is lighted when both the switch 50 is closed and the winding 27 is energized.

When the winding 27 (Fig. 8) is energized the contactor 52 and the contact 53 are in engagement and close a circuit to conventional motor controllers (not shown), which control the operation of the motors 14, 21 and 31. When the winding of the relay is deenergized, the engagements are broken between the contactors 51 and 52 and the contacts 35 and 53, respectively. This causes the lamp 55 to darken and the motors 14, 21 and 31 to be stopped.

In the operation of the apparatus described hereinabove, the end of one of the conductors 16—16 (Fig. 8) of the cable 11 is connected by the conductor 12 to ground, the conductors 16—16 are connected in series, and the other end of the series of the conductors is connected to the slip ring assembly 18. The free end of the cable 11 then is drawn around the capstans 13 and 20 (Fig. 1), and is secured to the take-up reel 30. The switch 50 (Fig. 8) then is closed, whereby the electrical circuit to the winding 27 is closed and a current flows through the conductor 29, the winding 27, the conductor 33, the slip ring assembly 18, the conductor 17, the series of conductors 16—16, and the grounded conductor 12. The current energizes the winding 27 and the contactors 51 and 52 are brought into engagement with the contacts 35 and 53, respectively, whereby the lamp 55 is lighted and the circuit to the motor controllers (not shown) is closed thereby indicating that a current is passing through the conductors 16—16 and enabling the motor controllers to be actuated to start the motors 14, 21 and 31 (Fig. 1).

The motors 14, 21 and 31 (Fig. 1) then are energized and the cable 11 is tensioned between the capstans 13 and 20, as described hereinabove, and the particular tension desired to be placed upon the cable 11 is obtained by turning the handwheel 23 to adjust the controller 24. This tension is indicated by the reading of the pointer 25 on the scale 26, and, of course, may be varied as desired by adjusting the controller 24. If a discontinuity of a type requiring tension on the cable to be opened is present in one of the conductors 16—16 (Fig. 8), it will be opened when the portion of the cable 11 containing it is positioned between the capstans 13 and 20, which place that portion of the cable 11 under a high tension. When the discontinuity is opened, the circuit to the winding 27 (Fig. 8) of the relay 28 is opened, the winding is deenergized, and the engagements between the contactors 51 and 52 and the contacts 35 and 53, respectively, are broken, whereby the lamp 55 is darkened indicating the presence of the discontinuity and the circuit to the motor controllers is broken, which causes the motors 14, 21 and 31 to be stopped. Thus, the portion of the cable 11 containing the discontinuity is located and may be marked for subsequent repairs.

The tensioning apparatus described hereinabove may be calibrated by a calibrating device 36 (Fig. 3), which includes a tension scale 40. A short cable 41 having interlocking terminals 42—42 thereon is secured to a hook 48 and a ring 49 of the scale 40 so that a loop 47 of the cable 41 is formed between the hook 48 and the ring 49. The terminals 42—42 then are placed in interlocking and connecting engagement with a pair of terminals 43—43 of a pair of cables 39—39, which are identical with the cable 11. One of the cables 39—39 then is placed over the capstan 13 and the other cable is placed over the capstan 20. Next, the motors 14 and 21 are energized and the tension on the cables 39—39 for any particular setting of the pointer 25 of the handwheel 23 relative to the scale 26 may be marked on the scale 26. A sufficient number of tests of the tensions for the various settings of the pointer 25 and the controller may be conducted and the scale 26 marked accordingly so that the pointer will indicate thereon the tension applied to the cable 11 for any particular setting of the pointer and the controller.

A block 44 (Fig. 2) has a plurality of grooved sheaves 45—45 rotatably mounted thereon by a plurality of pins 46—46. The sheaves 45—45 are mounted in staggered relationship upon the block 44 and form a sinuous path for the cable 11 when the block 44 is positioned along the path of the cable advanced from the capstan 13 to the capstan 20. The sheaves 45—45 are designed to have the cable 11 pass therearound and serve to flex the cable 11 when it is advanced thereover, whereby any discontinuities in the conductors 16—16 of the cable 11 will be shown by the test set 34. The block and the sheaves may be used very advantageously to flex both spliced and unspliced portions of cables.

An apparatus forming an alternative embodiment of the invention is shown in Figs. 4 and 5, and comprises a supply reel 110 containing a supply of a cable 111 to be tested. The conductors of the cable 111 are connected in series, and one end thereof is connected to ground by a conductor 112. A take-off capstan 113 is positioned in alignment with the supply reel 110 and the cable 111 is drawn over the capstan 113 by a tensioning capstan (not shown), which is similar to the capstan 20 and is driven by a constant speed motor (not shown). The capstan 113 (Fig. 5) is fixed to a shaft 114 of a gear box 117 of standard construction, which shaft is rotatably mounted in a bearing 115 fixed on a standard 116. A flanged gear 120 fastened rigidly to the shaft 114 is provided with a plurality of internal teeth 121—121, which mesh with gears 122—122 mounted on stub shafts 123—123. The stub shafts 123—123 are mounted rotatably in bearings 124—124 formed in a housing 125, which encloses the gears 120 and 122—122.

A gear 130 (Fig. 5), which meshes with the gear 122, is secured to an end of a brake shaft 126, which is rotatably mounted in a bearing 131 supported by a standard 132, and has a brake drum 133 secured rigidly to the end thereof. A pair of brake shoes 134—134 is mounted adjacent to the brake drum by a block 135, and an adjusting screw 136 and nuts 137—137 threaded thereon, serve to hold the brake shoes in contact with the brake drum. The set screw 136 may be adjusted to vary the braking action of the shoes on the brake drum 133.

The housing 125 (Fig. 5) is rotatably mounted on the shafts 114 and 126, which are axially aligned. A bracket 140 is secured to the housing, and brackets 141—141 are secured to the standards 116 and 132. Compression springs 142—142 positioned between the brackets 141—141 and the bracket 140 urge the housing 125 in a clockwise direction, as viewed in Fig. 4. The clockwise movement of the housing 125 is limited by an adjustable stop screw 145, which serves as a stop for a pointer 143 secured to the housing 125. The screw 145 has a pair of nuts 146—146 threaded thereon, which secure the screw adjustably to a support 147 secured to the standard 132. The support 147 holds the screw 145 in any adjusted position and also serves to support a scale 144. The pointer 143 moves along the scale 144 when the housing 125 is rotated in a counter-clockwise direction against the action of the springs 142—142.

In the operation of the embodiment of the invention shown in Figs. 4 and 5, one end of the conductors of the cable 111 is connected to a test set (not shown), which is identical with the test set 34 (Figs. 1 and 8), and is advanced by a tensioning capstan (not shown) from the supply reel 110 (Fig. 4) and around the take-off capstan 113, whereby the capstan 113 is rotated. The rotation of the capstan 113 is braked by the action of the brake shoes 134—134, which frictiontionally grip the brake drum 133. Since the brake drum 133 is fastened to the shaft 126, it retards the rotation of the shaft 126, which thereby retards the rotation of the gears 122—122 through the gear 130. The gears 122—122 retard the rotation of the gear 120, whereby the shaft 114 and the capstan 113 are braked and a high tension is applied to the portion of cable 111 being advanced to the tensioning capstan.

Since the gear 130 (Fig. 5) tends to retard the rotation of the gears 122—122 and the gear 120 tends to rotate the gears 122—122, the force applied to the gears 122—122 tends to revolve these gears, the shafts 123—123 and the housing 125 in a counter-clockwise direction, as viewed in Fig. 4. The rotation of the housing 125 is resisted by the compression springs 142—142, which bear against the bracket 140. However, the housing is rotated against the action of the springs proportionately to the amount of tension placed upon the cable 111, whereby the pointer 143 is moved along the scale 144 to a position in which it indicates the amount of tension applied to the cable. The conductors of the cable 111 then are tested in a manner similar to that outlined hereinabove in the first-described embodiment of the invention. The scale 144 can be calibrated by the calibrating device 36, so that the pointer 143 provides a visual indication of the tension applied to the cable.

An apparatus constituting a third embodiment of the invention is shown in Figs. 6 and 7 and includes a tensioning capstan 220, over which a cable 211 is placed and which is driven by a variable torque motor 221 through a chain drive 222. The motor 221 includes an armature shaft 223, which is rotatably mounted in bearings 224—224 supported by standards 225—225.

A bracket 226 (Fig. 7) secured to a housing 229 of the motor 221 and the housing are urged in a clockwise direction, as viewed in Fig. 7, by a compression spring 230, which is mounted between the bracket 226 and a fixed bracket 227. The housing 229 is free to rotate around the shaft 223 except as limited in one direction by the action of the compression spring 230 and in the other direction by a stop screw 234, which is adjustably secured to the housing by nuts 235—235. The stop screw 234 serves to strike an abutment plate 236 and limits the rotation of the housing 225 in a clockwise direction, as viewed in Fig. 7.

A pointer 231 (Fig. 7) rigidly secured to the housing 229 serves to indicate on a scale 232 the tension applied to the cable 211. When the motor 220 is energized the force required to turn the armature shaft 223, the drive 222 and the capstan 220 to advance the cable 211 rotates the housing 229 against the action of the compression spring 230, whereby the pointer 231 is moved along the scale 232 to indicate the tension applied to the cable 211. A takeup reel 240 (Fig. 6) serves to wind the cable 211 thereon as the cable is advanced by the capstan 220.

In the operation of the just-described apparatus, the cable 211 is drawn by the capstan 220 from a supply reel (not shown) and over a take-off capstan, which is driven by a constant speed motor (not shown), whereby the cable is placed under a high tension. The amount of tension is indicated by the reading of the pointer 231 on the scale 232.

The conductors of the cable 211 (Figs. 6 and 7) then are connected in series, one end thereof is connected to a test set (not shown) in a manner similar to that described hereinabove in the description of the first-described embodiment of the invention, and the test set serves to supply an electric current to the conductors under test and indicates discontinuities in one of the conductors. The apparatus just-described may be calibrated by the calibrating device 36 as described hereinabove.

The apparatus described hereinabove serves to place cables under high tensions, measures accurately the tension applied to cables, and tests the continuity of conductors of the cables, all being accomplished in rapid and inexpensive testing operations. It also serves at all times to give a visual indication of the amount of tension applied to cables whose conductors are under test, whereby the amount of the tension applied to the cables can be controlled closely.

What is claimed is:

1. In a testing apparatus, a capstan for advancing a conductor, a second capstan over which is advanced a conductor advanced by the first-mentioned capstan, an electric motor tending to rotate the second capstan at a predetermined peripheral rate of speed, a torque motor for applying a torque to the first-mentioned capstan, whereby the conductor is tensioned, a controller for controlling the torque of the torque motor, a handwheel for operating the controller, a fixed scale, and a pointer secured to the handwheel for indicating on the scale the amount of tension placed upon the conductor.

2. In a testing apparatus, a capstan for advancing a conductor, a second capstan over which is advanced a conductor advanced by the first-mentioned capstan, an electric motor tending to rotate the second capstan at a predetermined peripheral rate of speed, a torque motor for applying a torque to the first-mentioned capstan whereby the conductor is tensioned, a controller for controlling the torque of the torque motor, means for selectively adjusting the controller, and means operable by the controller-adjusting means for indicating the amount of tension placed upon the conductor.

SAMUEL E. BRILLHART.

REFERENCES CITED

The following references are of record in the file of this patent:

UNITED STATES PATENTS

| Number | Name | Date |
|---|---|---|
| 1,962,029 | Murphy et al. | June 5, 1934 |
| 2,177,489 | Jamieson | Oct. 24, 1939 |
| 2,359,170 | Symmes | Sept. 26, 1944 |
| 1,955,540 | Ellis et al. | Apr. 17, 1934 |
| 2,114,400 | Parvin | Apr. 19, 1938 |
| 1,927,045 | Parsons | Sept. 19, 1933 |